United States Patent
Jiang

(10) Patent No.: US 8,410,736 B2
(45) Date of Patent: Apr. 2, 2013

(54) CONTROLLABLE RECTIFICATION DEVICE AND ELECTRIC MOTOR COMPRISING THE SAME

(75) Inventor: Xianhong Jiang, Shenzhen (CN)

(73) Assignee: BYD Company Limited, Shenzhen, Guangdong (CN)

( * ) Notice: Subject to any disclaimer, the term of this patent is extended or adjusted under 35 U.S.C. 154(b) by 0 days.

(21) Appl. No.: 13/278,395

(22) Filed: Oct. 21, 2011

(65) Prior Publication Data

US 2012/0038296 A1 Feb. 16, 2012

Related U.S. Application Data

(63) Continuation of application No. PCT/CN2010/071925, filed on Apr. 20, 2010.

(30) Foreign Application Priority Data

Apr. 21, 2009 (CN) .......................... 2009 1 0135537

(51) Int. Cl.
*H02P 21/00* (2006.01)

(52) U.S. Cl. ......... 318/400.02; 318/400.26; 318/400.27; 318/599; 318/799; 318/801; 363/40; 363/56.01; 363/57; 363/98

(58) Field of Classification Search ............. 318/400.01, 318/400.02, 432, 799, 800, 801, 722, 400.26, 318/400.27, 400.28, 400.29, 599, 268; 388/811, 388/831; 363/40, 56.01, 57, 98

See application file for complete search history.

(56) References Cited

U.S. PATENT DOCUMENTS

| | | | | |
|---|---|---|---|---|
| 6,008,616 | A * | 12/1999 | Nagayama et al. | 318/773 |
| 6,624,601 | B2 * | 9/2003 | Arimitsu et al. | 318/34 |
| 7,064,514 | B2 * | 6/2006 | Iwaji et al. | 318/801 |
| 8,154,230 | B2 * | 4/2012 | Kimura | 318/400.01 |
| 2005/0127865 | A1 * | 6/2005 | Kiuchi et al. | 318/802 |
| 2008/0067960 | A1 * | 3/2008 | Maeda et al. | 318/400.02 |

FOREIGN PATENT DOCUMENTS

| | | |
|---|---|---|
| CN | 2452199 Y | 10/2001 |
| JP | 63043570 A | 2/1988 |
| JP | 1-122370 A | 5/1998 |
| JP | 2002-78104 A | 3/2002 |

OTHER PUBLICATIONS

Written Opinion of the International Searching Authority mailed Jul. 29, 2010 for PCT Patent Application No. PCT/CN2010/071925.
International Search Report mailed Jul. 29, 2010 for PCT Patent Application No. PCT/CN2010/071925.

* cited by examiner

*Primary Examiner* — Antony M Paul
(74) *Attorney, Agent, or Firm* — Finnegan, Henderson, Farabow, Garrett & Dunner, LLP

(57) ABSTRACT

The present invention discloses a controllable rectification comprising an inverter (10), a control panel (20) and a drive panel (30). The inverter (10) may comprise three switch element groups connected in parallel. Each switch element group may comprise at least two switch elements connected in parallel. Each switch element may comprise an upper bridge-arm switch and a lower bridge-arm. The control panel (20) may generate a PWM waveform. The drive panel (30) may generate a drive voltage according to the PWM waveform to drive the upper bridge-arm switch and the lower bridge-arm switch of each switch element to conduct or break respectively, and to make the upper bridge-arms of the same switch element group to conduct or break simultaneously, and to make the lower bridge-arms of the same switch element group to conduct or break simultaneously. The present invention further discloses an electric motor comprising the same.

16 Claims, 4 Drawing Sheets

CONTROLLABLE RECTIFICATION DEVICE AND ELECTRIC MOTOR COMPRISING THE SAME

CROSS-REFERENCE TO RELATED APPLICATIONS

This application is a continuation of International Application No. PCT/CN2010/071925, filed Apr. 20, 2010, which claims priority to and benefit of Chinese Patent Application No. 200910135537.8, filed with the State Intellectual Property Office of P.R. China on Apr. 21, 2009, the contents of which are incorporated by reference herein in their entirety.

FIELD OF THE INVENTION

The present invention relates to an electric motor, more particularly, to a controllable rectification device and an electric motor comprising the controllable rectification device.

BACKGROUND OF THE INVENTION

Normally, a controllable rectification device for an electric motor comprises an inverter, a control panel and a drive panel. The inverter comprises three switch elements connected in parallel. Each switch element comprises an upper bridge-arm switch and a lower bridge-arm switch. The control panel is used to collect peripheral sample signals, and to generate a PWM waveform according to a desired control strategy. The drive panel is used to generate a drive voltage according to the PWM waveform first, then to drive upper bridge-arm switches and lower bridge-arm switches of the three switch elements to connect or break circuits separately, thus a three-phase symmetry current is generated to drive the electric motor.

FIG. 1 shows a layout diagram of three switch elements in prior art. The three switch elements are IGBT (Insulated Gate Bipolar Transistor) 11, IGBT 13 and IGBT 15 respectively. IGBTa comprises an upper bridge-arm IGBTa' and a lower bridge-arm IGBTa" (a=11, 13, 15). The connection points of the upper bridge-arm switches and the lower bridge-arm switches of the three switch elements are connected to the three-phase windings U, V, W of the electric motor respectively. The drive panel is used to control the upper bridge-arm switch and the lower bridge-arm switch to be conducted as following order: IGBT11'-IGBT13", IGBT11'-IGBT15", IGBT13'-IGBT11", IGBT13'-IGBT15", IGBT15'-IGBT11", and IGBT15'-IGBT13", thus providing alternating currents to the three-phase windings U, V, W of the electric motor.

Currently, hybrid power vehicles generally use the engine and the electric motor as power sources respectively, so that the electric motor may have a low power. However, for an electric vehicle, the only power supplier is the electric motor, thus there is a demand for an electric motor with high power. For an electric motor with lower power, a normal IGBT may meet the requirement of the controllable rectification device. However, for an electric motor with high power, adoption of a normally used low power IGBT in the controllable rectification device may cause some limits of the torque and the power of the motor. If the low power IGBT is replaced by a high power IGBT, the cost of the controllable rectification device will increase rapidly, because the price of a high power IGBT is normally five times of a low power IGBT. And the power consumption of the high power IGBT is relatively large which may lead to waste of energy.

SUMMARY OF THE INVENTION

In viewing of above, there is a need to provide a controllable rectification device with a low cost. Further, there is a need to provide an electric motor comprising the controllable rectification device to lower the cost thereof and obviate the usage of IGBT with a high power.

According to an embodiment of the present invention, a controllable rectification device may be provided, comprising an inverter, a control panel and a drive panel. The inverter may comprise three switch element groups connected in parallel. Each switch element group may comprise at least two switch elements connected in parallel. Each switch element may comprise an upper bridge-arm switch and a lower bridge-arm switch. The control panel may generate a PWM waveform. And the drive panel may generate a drive voltage according to the inputted PWM waveform to drive the upper bridge-arm switch and the lower bridge-arm switch of each switch element to conduct or break separately, and to make the upper bridge-arm switches in the same switch element group to conduct or break simultaneously and to make the lower bridge-arm switch of the same switch element group to conduct or break simultaneously.

According to another embodiment of the invention, an electric motor may be provided, comprising: three phase windings, and a controllable rectification device as described above. Each phase winding of the three-phase windings may be electrically connected with each junction point between the upper bridge-arm switch and the lower bridge-arm switch in the switch element group.

According to the present invention, the drive panel drives at lease two parallel switch elements in the switch element group to conduct or break simultaneously, thus at least two parallel switch elements in each switch element group may be functionally regarded as one switch element in the art. Because the at lease two parallel switch elements can distribute current flowing through the whole switch elements, the switch element of present controllable rectification device has an enhanced current resistant performance, i.e. enhanced resisting high current performance, which is much better than those normally used in the art and obviates the use of a high power switch element which is much more expensive.

In addition, According to the electric motor comprising the controllable rectification device as described above, the controllable power range thereof is increased by connecting switch elements with a scale of lower level in parallel, thus reducing manufacturing cost dramatically whereas efficiently using the available resources.

Additional aspects and advantages of the embodiments of present invention will be given in part in the following descriptions, become apparent in part from the following descriptions, or be learned from the practice of the embodiments present invention.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings, in which.

DETAILED DESCRIPTION OF THE PREFERRED EMBODIMENT

Hereinafter embodiments of the invention will be described, the examples of which are shown in the accompanying Figures. Similar labels indicate the same or the similar components, or the components with the same or similar functions. The embodiments below are used for expounding principle and/or theorem of the present invention rather for limitation.

Figure 1:
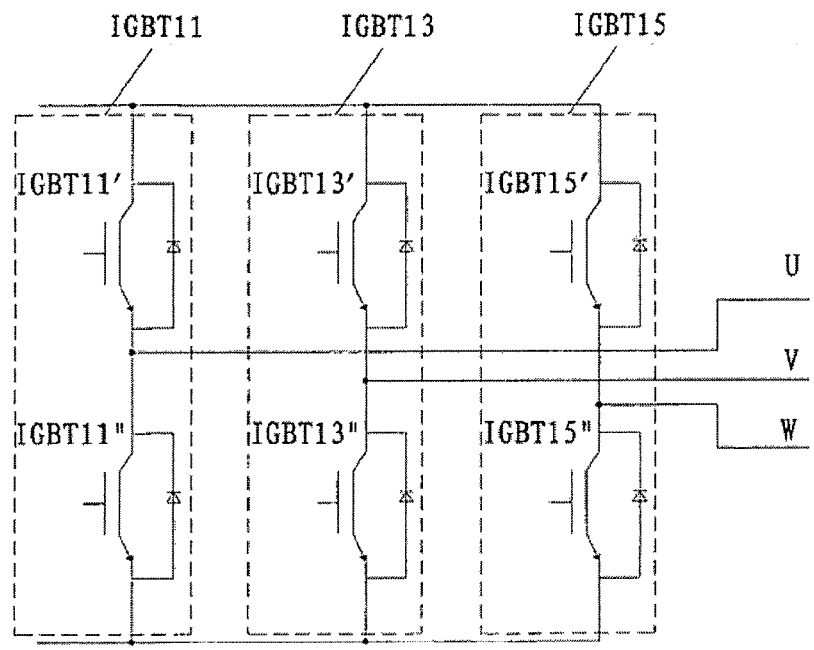
FIG. 1 shows a layout diagram of a three switch elements in prior art.
Figure 2:
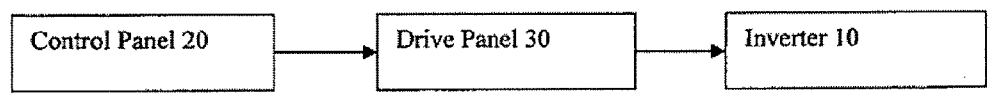
FIG. 2 shows a schematic view of a controllable rectification device for an electric motor according to an embodiment of the invention.

As shown in FIG. 2, a controllable rectification device may comprise an inverter 10, a control panel 20 and a drive panel 30. The inverter 10 may comprise three switch element groups connected in parallel. Each switch element group may comprise at least two switch elements connected in parallel. Each switch element may comprise an upper bridge-arm switch and a lower bridge-arm switch. The control panel 20 may generate a PWM waveform based on a desired controlling strategy. The drive panel 30 may generate a drive voltage according to the inputted PWM waveform, then to drive the upper bridge-arm switch and the lower bridge-arm switch of each switch element to conduct or break separately. And the upper bridge-arm switches in the same switch element group are configured to conduct or break at the same time while the lower bridge-arm switches in the same switch element group are configured to conduct or break at the same time as well.

Figure 3:
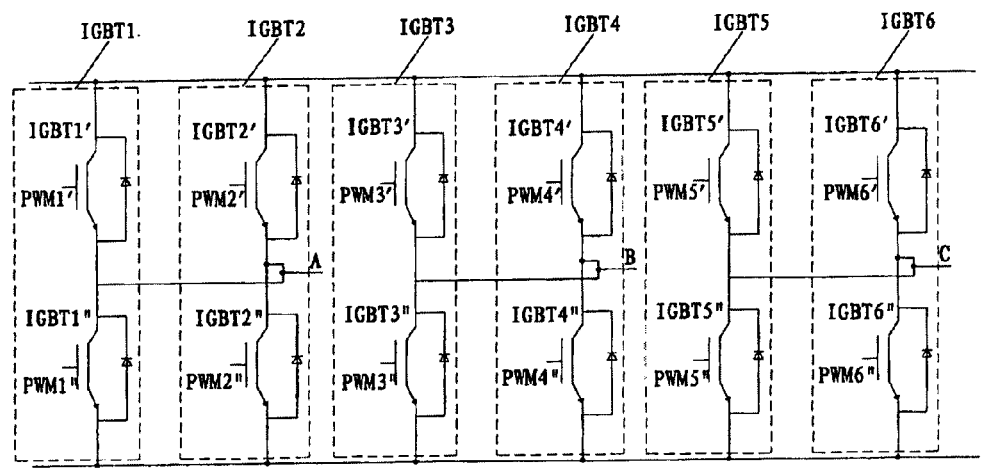
FIG. 3 shows a schematic view of an inverter of the controllable rectification device according to an embodiment of the invention.

FIG. 3 shows a schematic view of a controllable rectification device for an electric motor according to an embodiment of the invention where each switch element group may comprise two switch elements. However, each switch element group may comprise more than two switch elements connected in parallel. In FIG. 3, the switch elements Q1-Q3 may comprise IGBT1-IGBT2, IGBT3-IGBT4, and IGBT5-IGBT6 respectively. Each switch element may have an upper bridge-arm switch and a lower bridge-arm switch. That is the switch IGBTa may comprise an upper bridge-arm switch IGBTa' and a lower bridge-arm switch IGBTa" in which "a" may be an integer ranging from 1 to 6. The control terminals of the upper bridge-arm switch IGBTa' and the lower bridge-arm switch IGBTa" may be connected respectively with the drive voltage from the drive panel 30, i.e., PWMa' and PWMa".

As shown in FIG. 3, when n in PWMn' is the same as n in PWM(n+1)', drive voltages PWMn' and PWM(n+1)' where n may be 1, 3 or 5 are synchronous, thus the upper bridge-arm switches in the same switch element group can be on or off synchronously. Similarly, when n in PWMn' is the same as n in PWM(n+1)' and the drive voltage PWMn" and PWM(n+1)" where n may be 1, 3 or 5, are synchronous, the lower bridge-arm switches in the same switch element group can be on or off synchronously. The upper bridge-arm switch and the lower bridge-arm switch of the same switch element may not be on or off at the same time. The switch element group has the same functional effect as the switch element in the prior art inverter, but the current resistance performance of the whole inverter according to the present invention is increased by connecting a plurality of switch elements in parallel. For example, when the current resistance of IGBT1 and IGBT2 may be both 900A, the current resistance capability of the switch element group formed by IGBT1 and IGBT2 may be 1800A. The present invention may be not limited to the switch element group with two switch elements as shown in FIG. 3. Each switch element group may comprise more than two switch elements connected in parallel to distribute current therethrough, which can enhance the current resistance performance of the whole inverter. According to an embodiment of the present invention, each switch element group may comprise 2 to 4 switch elements connected in parallel. And the driving voltage for the plurality of switch elements connected in parallel may be synchronous.

According to an embodiment of the invention, the drive panel may be formed by two standalone sub-drive panels respectively. And the two standalone sub-drive panels may provide drive voltage of PWMa' and PWMa" respectively ("a" may be an integer ranging from 1 to 6). When n in PWMn' is the same as n in PWM(n+1)', the drive voltage PWMn' and PWM(n+1)' (n may be 1, 3 or 5) are synchronous with each other, and the drive voltage PWMn" and PWM(n+1)" (n may be 1, 3 or 5) may be synchronous with each other. The drive voltage PWMa' and PWMa" ("a" may be an integer ranging from 1 to 6) may be provided by a single drive panel.

According to an embodiment of the present invention, the switch element may be an IGBT, or other controllable switch device. According to an embodiment of the present invention, the switch element may be Intelligent Power Module (IPM). An IPM may be an advanced combined integration power part with an IGBT as a kernel. For example, an IPM may comprise an IGBT tube core with a high speed and a low cost, an optimized gate trigger circuit and a rapid protection circuit, and thus it may have the advantages of rapid switching speed with low loss, thus increasing the responding speed of the controllable rectification device and decreasing the power loss thereof accordingly.

In addition, the present invention discloses an electric motor. The electric motor may comprise three-phase windings and a controllable rectification device as described above. Each phase winding of the three-phase windings may be electrically connected with each junction point between the upper bridge-arm switch and the lower bridge-arm switch of each switch element group in the above controllable rectification device.

Figure 4:
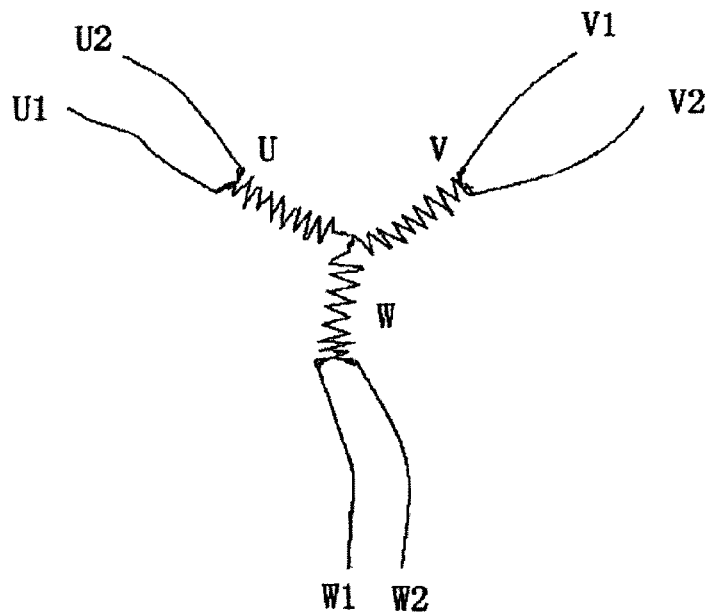
FIG. 4 shows a schematic view of the three-phase windings of the electric motor according to an embodiment of the invention.

According to an embodiment of the present invention, as shown in FIG. 4, each phase winding of the three-phase windings may comprise at least two windings connected in parallel. The at lease two windings may be electrically connected with the junction point between the upper bridge-arm switch and the lower bridge-arm switch of each switch element group in the above controllable rectification device. For example, the junction point A may be electrically connected with the winding U1 and the winding U2, the junction point B may be electrically connected with the winding V1 and the winding V2, the junction point C may be electrically connected with the winding W1 and the winding W2. In this embodiment, the magnetic flux of the electric motor may be increased and the electric motor may generate a higher torque. According to an embodiment of the present invention, each phase winding may comprise 2 to 4 windings connected in parallel.

Figure 5:
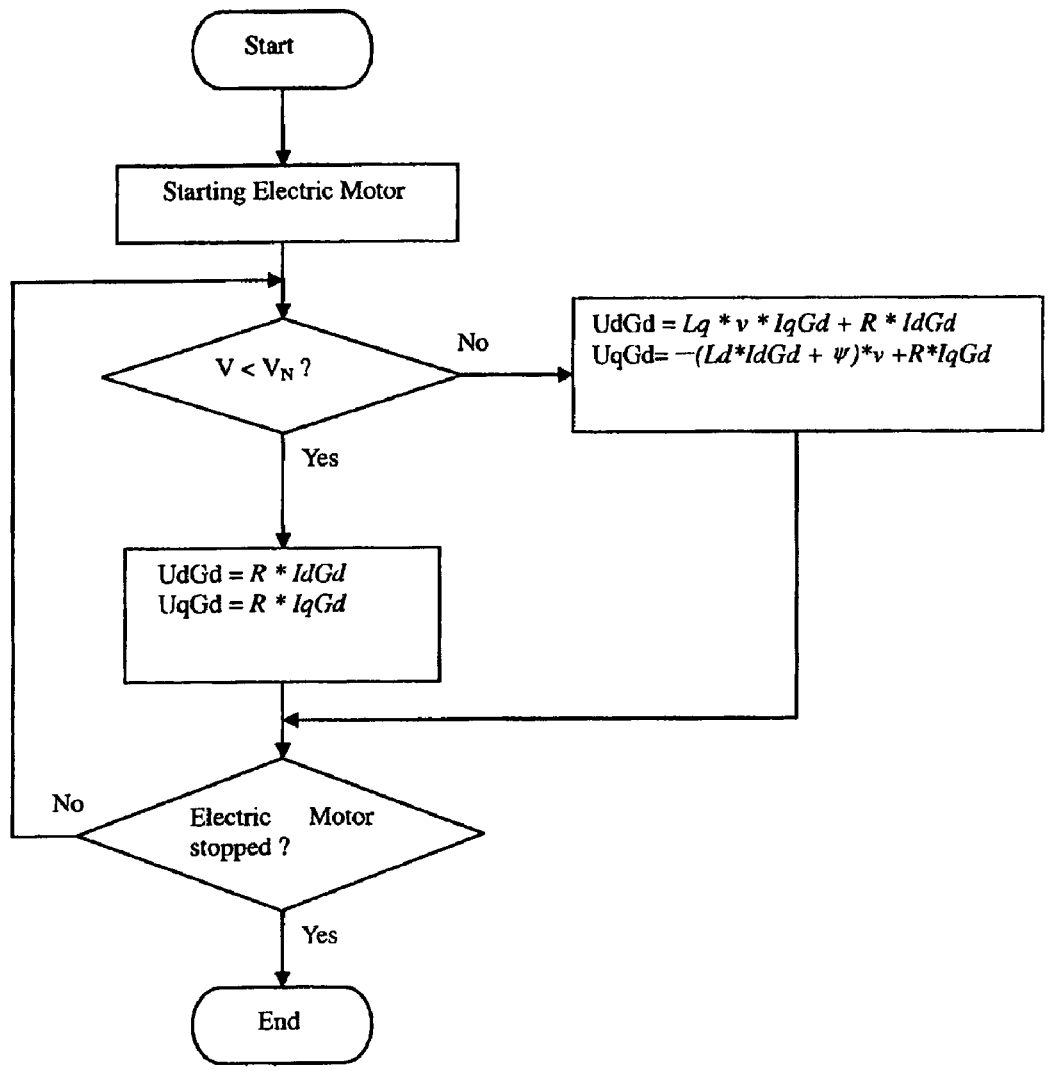
FIG. 5 shows a flow chart of regulating d-axis (direct-axis) voltage and q-axis (quadrature-axis) voltage of the electric motor according to an embodiment of the invention.

For an electric motor with a high rated power, the rotating torque is low when the electric motor runs with a low rotating speed whereas the power is low when the electric motor runs with high rotating speed. In viewing of above, the present invention discloses the following strategy for controlling the electric motor. FIG. 5 shows a flow chart of regulating a d-axis (direct-axis) voltage and a q-axis (quadrature-axis) voltage of the electric motor according to an embodiment of the invention. As shown in FIG. 5, the d-axis voltage and the q-axis voltage of the electric motor may be adjusted with the following formula:

$$UdGd=R*IdGd$$

$$UqGd=R*IqGd, \quad (1)$$

when $V<V_N$ $$UdGd=Lq*v*IqGd+R*IdGd$$

$$UqGd=-(Ld*IdGd+\psi)*v+R*IqGd, \quad (2)$$

when $V \leqq V_N$
where V may represent a rotating speed of the electric motor, $V_N$ may represent a predetermined rotating speed, UdGd may represent the d-axis voltage, UqGd may represent the q-axis voltage, R may represent the resistance of the three-phase windings in the electric motor, IdGd may represent a d-axis current, IqGq may represent a q-axis current, Ld may represent an inductance which the motor stator generates along the d-axis, Lq may represent an inductance which the motor stator generates along the q-axis; and $\psi$ may represent the permanent magnet flux of the motor rotor. Thus, a control strategy using a high dummy resistance—critical speed may be provided. After the electric motor is started, it is determined if the electric motor speed V is lower than $V_N$ or not. If yes, the voltage is controlled to be loaded according to formula (1). If the electric motor speed V is higher than or equal to the predetermined speed $V_N$, then controlling the direct-axis and q-axis voltages may be controlled according to the normal electric motor winding resistance. That is, the direct-axis and q-axis voltages are controlled by the formula (2).

Because the high power electric motor has three-phase windings with a small resistance, the rotating torque accelerating speed for the high power electric motor may be increased by adopting the control strategy as described above. The control strategy may be executed repeatedly and continuously during the operation of the electric motor, which ensures the starting stability of the electric motor and continuity of power thereof.

According to an embodiment of the present invention, the predetermined speed $V_N$ may be determined by a characteristic curve of the electric motor. Because the characteristic curve of a permanent magnet synchronous electric motor may be divided into a constant torque area and a constant power area, the speed at the turning point of the two areas may be deemed as the critical speed $V_N$, that is:

$$V_N=9550 \times P/T, \quad (3)$$

where P may represent a constant power of the electric motor, T may represent a constant torque of the electric motor.

For example, presuming that the electric motor with a high power has a constant power of 160 Kw with a constant torque of about 450 Nm (preset in manufacturing), the critical speed $V_N$ may be 3396 rpm with the formula (3).

Figure 6:
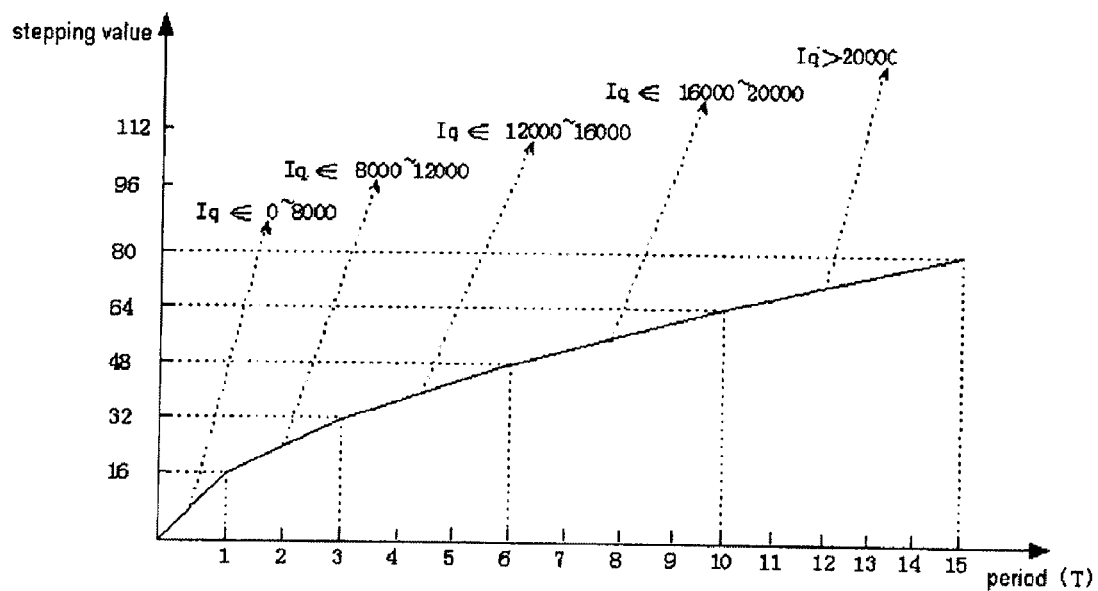
FIG. 6 shows a curve representing a relationship among a q-axis current, a throttle responding period and a throttle stepping value of an electric motor according to an embodiment of the invention.

FIG. 6 shows a curve representing a relationship among a q-axis current, a throttle responding period and a throttle stepping value of the electric motor according to an embodiment of the invention. As shown in FIG. 6, in the whole electric motor operating process, the electric motor may regulate the throttle responding period and the throttle stepping value of the electric motor according to the electric motor q-axis current.

For example, for an electric motor using 32 bit digital signal processing (DSP) control logic, when $0 \leqq |Iq| \leqq 8000$, the throttle responding period may be 1T, the throttle responding stepping value may be 16; when $8000<|Iq| \leqq 12000$, the throttle responding period may be 2T, the throttle responding stepping value may be 16; when $12000<|Iq| \leqq 16000$, the throttle responding period may be 3T, the throttle responding stepping value may be 16; when $16000<|Iq| \leqq 20000$, the throttle responding period may be 4T, the throttle responding stepping value may be 16; when $|Iq|>20000$, the throttle responding period may be 5T, the throttle responding stepping value may be 16. T may represent the time that a throttle accelerating control program stored in an interrupt system of the electric motor is dispatched and run by one time. According to an embodiment of the invention, T may be 100 us; Iq may represent a value of the q-axis current; the responding stepping value may fall within a range of [0, 32768] (the range may be determined by bits of the DSP in the electric motor, here the DSP may be 32 bits) which corresponds to 0~100% of the actual throttle. The throttle responding stepping value 16 may represent an actual throttle of $16/32768 \approx 0.05\%$. Iq may fall within the range of [−32768, 32768] (the range may be determined by the bits of the DSP in the electric motor, here the DSP may be 32 bit) which corresponds to an actual current of [−1000A, 1000A] (the actual current in three-phase windings of the electric motor may be collected by hall current sensors, then through Clarke transformation and Park transformation, the three-phase currents may be transformed into the d-axis and q-axis currents. The range of [−1000A, 1000A] is the hall current range of the q-axis current calculated by the range of the hall current sensor), that is, q-axis current of 8000 actually represents the actual current of $$\frac{8000 \times 1000}{32768} \approx 244_A.$$

The curve relation of q-axis current, throttle responding speed period and throttle responding stepping value may help smooth the throttle responding speed, accelerate the throttle responding speed, and avoid the switch element self-protection or switch element burnout in the controllable rectification device which may otherwise occur when applying a drastic throttle depth change directly causing a given current on the electric motor to be changed rapidly. Based on the control strategy of a high dummy resistance-critical rotating speed and the smoothing of the throttle responding speed as described above, the PI parameters of the electric motor may be adjusted. And the starting stability of the electric motor, continuity of the power supply may be ensured and the switch self-protection or burnout for the switch elements in the controllable rectification device may also be avoided due to an enhanced throttle responding speed.

According to an embodiment of the present invention, an electric vehicle comprising the electric motor as described hereinabove may be provided.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:
1. An electric motor, comprising:
   three phase windings, and a an inverter controllable device comprising:
an inverter including three switch element groups connected in parallel, each switch element group including at least two switch elements connected in parallel, each switch element including an upper bridge-arm switch and a lower bridge-arm switch;
a control panel for generating a pulse width modulation (PWM) waveform; and
a drive panel for generating a drive voltage according to the PWM waveform to drive the upper bridge-arm switch and the lower bridge-arm switch of each switch element to connect or break separately, and to drive the upper bridge-arm switches in the same switch element group to connect or break synchronously and to drive the lower bridge-arm switches of the same switch element group to connect or break synchronously;
wherein each phase winding of the three-phase windings is electrically connected with each junction point between the upper bridge-arm switch and the lower bridge-arm switch in the switch element group; and
a d-axis voltage and a q-axis voltage of the motor is adjusted according to the following formula:
when $V<V_N$, $$UdGd=R*IdGd$$

$$UqGd=R*IqGd;$$

when $V \geq V_N$, $$UdGd=Lq*v*IqGd+R*IdGd$$

$$UqGd=-(Ld*IdGd+\psi)*v+R*IqGd,$$

where V represents a rotating speed of the electric motor,
$V_N$ represents a predetermined rotating speed,
UdGd represents the d-axis voltage,
UqGd represents the q-axis voltage,
R represents a resistance of the three-phase windings in the electric motor,
IdGd represents a d-axis current,
IqGq represents a q-axis current,
Ld represents an inductance which a motor stator generates along the d-axis,
Lq represents an inductance which the motor stator generates along the q-axis; and
$\psi$ represents a permanent magnet flux of the motor rotor.

2. The electric motor according to claim 1, wherein each phase winding of the three phase windings comprises at least two windings which are connected in parallel, the at least two windings are electrically connected with the junction point between the upper bridge-arm and the lower bridge-arm in each switch element group of the controllable rectification device.

3. The electric motor according to claim 1, wherein the predetermined rotational speed $V_N$ is determined by a characteristic curve of the electric motor.

4. The electric motor according to claim 3, wherein the electric motor is a permanent magnet synchronous electric motor, and the predetermined rotational speed $V_N$ is calculated by the following formula:

$$V_N=9550 \times P/T$$

where P represents a constant power of the electric motor, T represents a constant torque of the electric motor.

5. The electric motor according to claim 1, wherein a throttle responding period and a throttle stepping value are adjusted by the electric motor according to the q-axis current of the motor during the running of the electric motor.

6. The electric motor according to claim 5, wherein, the electric motor has a 32-bit digital signal processing (DSP) circuit, and
the throttle responding period is 1T, the throttle responding stepping value is 16 when $0 \leq |Iq| \leq 8000$;
the throttle responding period is 2T, the throttle responding stepping value is 16 when $8000 < |Iq| \leq 12000$;
the throttle responding period is 3T, the throttle responding stepping value is 16 when $12000 < |Iq| \leq 16000$;
the throttle responding period is 4T, the throttle responding stepping value is 16 when $16000 < |Iq| \leq 20000$; and
the throttle responding period is 5T, the throttle responding stepping value is 16 when $|Iq| > 20000$;
where T represents the time that a throttle accelerating control program stored in an interrupt system of the electric motor is dispatched and run by one time;
Iq represents the value of the q-axis current; and
the responding stepping value falls within a range of [0, 32768] which corresponds to an actual throttle range of 0~100%.

7. The electric motor according to claim 6, wherein T is about 100 us and Iq falls within a range of [−32768, 32768] which corresponds to a current range of [−1000A, 1000A].

8. An electric vehicle comprising the electric motor according to claim 1.

9. The electric motor according to claim 1, wherein the switch element includes an Insulated Gate Bipolar Transistor.

10. The electric motor according to claim 1, wherein the switch element includes an intelligent power module.

11. A method for controlling an electric motor comprising:
determining if an electric motor rotating speed V is lower than a predetermined rotating speed $V_N$;
if yes, adjusting a d-axis voltage and a q-axis voltage of the electric motor according to the following formula:

$$UdGd=R*IdGd$$

$$UqGd=R*IqGd;$$

if no, adjusting the d-axis voltage and a q-axis voltage of the electric motor according to the following formula:

$$UdGd=Lq*v*IqGd+R*IdGd$$

$$UqGd=-(Ld*IdGd+\psi)*v+R*IqGd,$$

where V represents a rotating speed of the electric motor,
UdGd represents the d-axis voltage,
UqGd represents the q-axis voltage,
R represents the resistance of the three-phase windings in the electric motor,
IdGd represents a d-axis current,
IqGq represents a q-axis current,
Ld represents an inductance which a motor stator generates along the d-axis,
Lq represents an inductance which the motor stator generates along the q-axis; and
$\psi$ represents the permanent magnet flux of the motor rotor.

12. The method according to claim 11, wherein the predetermined rotational speed $V_N$ is determined by a characteristic curve of the electric motor.

13. The method according to claim 12, wherein the electric motor is a permanent magnet synchronous electric motor, and the predetermined rotational speed $V_N$ is calculated by the following formula:

$$V_N=9550 \times P/T$$

where P represents a constant power of the electric motor, T represents a constant torque of the electric motor.

14. The method according to claim 11, wherein a throttle responding period and a throttle stepping value are adjusted by the electric motor according to the q-axis current of the motor during the running of the electric motor.

15. The method according to claim 14, wherein, the electric motor has a 32-bit digital signal processing (DSP) circuit, and the throttle responding period is 1T, and the throttle responding stepping value is 16, when $0 \leq |Iq| \leq 8000$;

the throttle responding period is 2T, and the throttle responding stepping value is 16, when $8000 < |Iq| \leq 12000$;

the throttle responding period is 3T, and the throttle responding stepping value is 16, when $12000 < |Iq| < 16000$;

the throttle responding period is 4T, and the throttle responding stepping value is 16, when $16000 < |Iq| \leq 20000$; and the throttle responding period is 5T, and the throttle responding stepping value is 16, when $|Iq| > 20000$;

where T represents the time that a throttle accelerating control program stored in an interrupt system of the electric motor is dispatched and run by one time;

Iq represents the value of the q-axis current; and the responding stepping value falls within a range of [0, 32768] which corresponds to an actual throttle range of 0~100%.

16. The method according to claim 15, wherein T is about 100 us and Iq falls within a range of [−32768, 32768] which corresponds to a current range of [−1000A, 1000A].

* * * * *

UNITED STATES PATENT AND TRADEMARK OFFICE
CERTIFICATE OF CORRECTION

PATENT NO. : 8,410,736 B2  
APPLICATION NO. : 13/278395  
DATED : April 2, 2013  
INVENTOR(S) : Xianhong Jiang Page 1 of 1

It is certified that error appears in the above-identified patent and that said Letters Patent is hereby corrected as shown below:

On the Title Page, Item (30), in the "Foreign Application Priority Data",
"2009 1 0135537" should read --200910135537.8--.

In the Claims:

In claim 1, column 7, line 1, before "an inverter", delete "a".

In claim 15, column 9, line 15, "$12000<|Iq|<16000;$" should read
--$12000<|Iq|\leq16000;$--.

Signed and Sealed this  
Fourth Day of June, 2013

Teresa Stanek Rea  
*Acting Director of the United States Patent and Trademark Office*